Aug. 10, 1937.   S. O. MYERS   2,089,403
CREAM COOLER
Filed Aug. 19, 1935   2 Sheets-Sheet 1
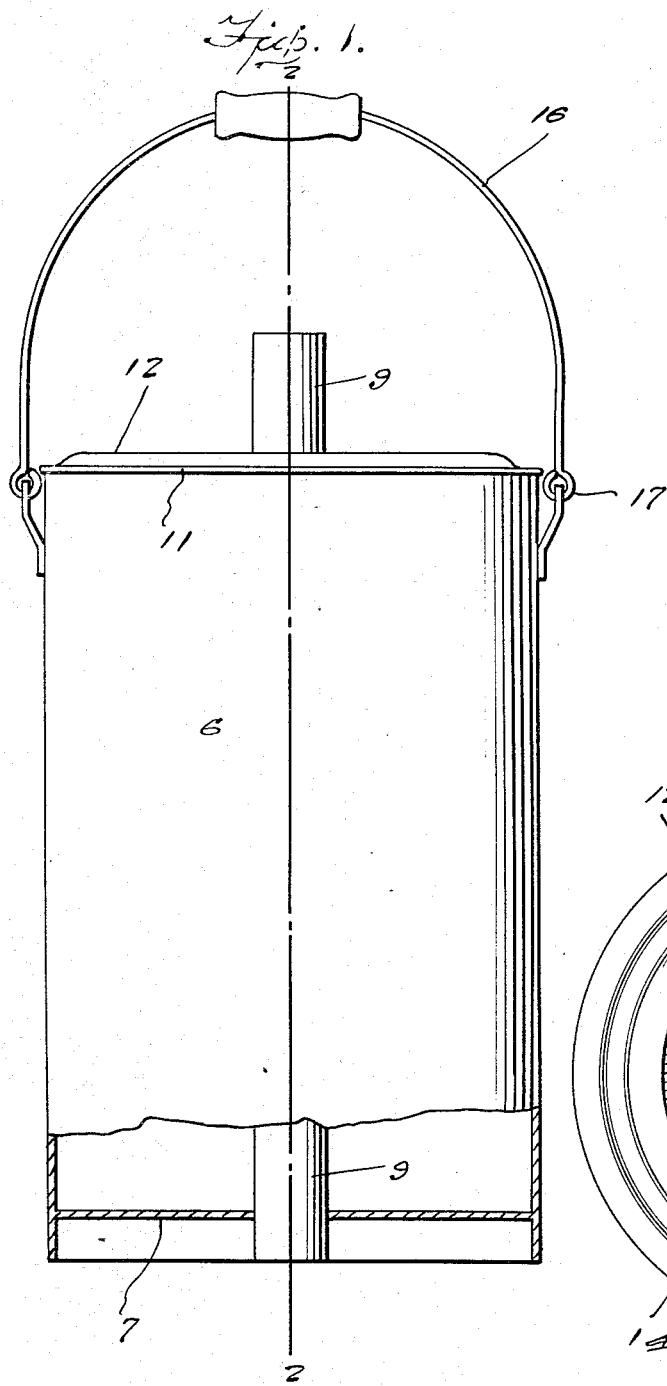
Inventor
S. O. Myers
By Clarence A. O'Brien
Attorney Aug. 10, 1937. S. O. MYERS 2,089,403
CREAM COOLER
Filed Aug. 19, 1935 2 Sheets-Sheet 2
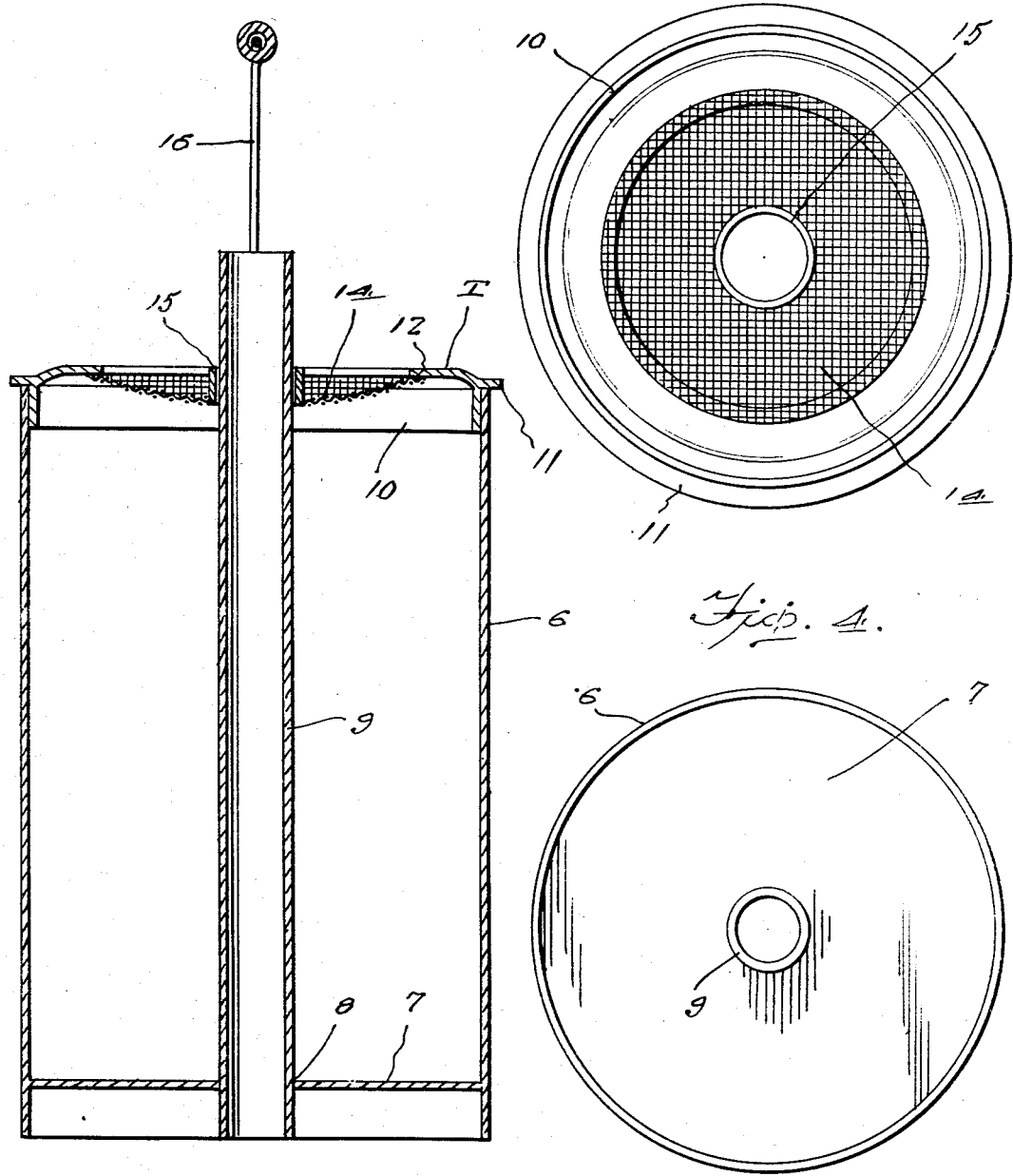

Patented Aug. 10, 1937

2,089,403

UNITED STATES PATENT OFFICE 2,089,403

CREAM COOLER

Scott O. Myers, Dougherty, Iowa

Application August 19, 1935, Serial No. 36,920

1 Claim. (Cl. 31—4)

The present invention relates generally to receptacles and particularly a receptacle for receiving cream having incorporated therein means whereby the cream may be effectively and efficiently cooled.

An important object of the invention resides in the provision of a receptacle of this nature which is simple in its construction, easy to manipulate and thoroughly efficient and reliable in use.

Another important object of the invention resides in the provision of a receptacle of this nature which is inexpensive to manufacture, compact and convenient in its arrangement of parts and otherwise well adapted for the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 1 is a side elevation of a receptacle embodying the features of my invention showing the lower portion broken away and in section.

Figure 2 is a vertical section through the receptacle taken substantially on the line 2—2 of Figure 1.

Figure 3 is a top plan view of the receptacle showing the handle removed.

Figure 4 is a bottom plan view thereof.

Figure 5 is a bottom plan view of the top.

Figure 6 is a perspective view of the tube.

Referring to the drawings in detail it will be seen that the numeral 6 denotes a cylindrical wall forming the body of the receptacle and being provided with a bottom 7 having a central opening 8 in which is fixed a tube 9 which extends slightly below the bottom 7 to terminate in co-planar relationship with the bottom edge of the wall 6 and which extends a distance above the upper edge thereof. This tube is fixed in the opening 8 in any suitable manner. The letter T denotes generally a top comprising a cylindrical flange 10 to telescope inside the upper end of the body 6 and having an outwardly directed annular flange 11 to rest on the upper edge of the body 6 and provided with an inwardly directed flange 12 to which is fixed a foraminous portion 14 the center of which is fixed to a sleeve 15 circumjacent the tube 9.

A bail or handle 16 is secured as at 17 or in any other suitable manner to the body 6.

From the above detailed description it will be seen that cream in the receptacle may be cooled by a stream of water passing through the tube 9 which may be accomplished by a suitable connection with an ordinary garden hose or any other suitable means.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention what I claim as new is:—

A cream cooler of the class described comprising a substantially cylindrical receptacle provided with a centrally apertured elevated bottom, a vertically disposed, centrally arranged water circulating tube having its lower end attached to said bottom and extending through and beyond the central aperture and terminating substantially flush with the extreme lower edge of said cylindrical receptacle, the upper end of said tube extending above the corresponding end of said receptacle, a removable closure fitted into said upper end, said closure including an annulus having an annular depending flange intermediate its outer and inner peripheral edges, the projecting marginal edge of said annulus constituting a stop flange, the depending annular flange fitting telescopically into the upper end portion of said receptacle, a downwardly and inwardly dished screen of annular form, said screen having its outer marginal edge attached to the inner peripheral edge of said annulus, said screen constituting a concave aerating and straining member and having its inner peripheral edge provided with an upstanding collar, the aforementioned circulating tube extending through and beyond said collar.

S. O. MYERS.